US008963818B2

(12) United States Patent
Kim et al.

(10) Patent No.: US 8,963,818 B2

(45) Date of Patent: Feb. 24, 2015

(54) DISPLAY PANEL AND DISPLAY APPARATUS HAVING THE SAME

(75) Inventors: Chang-Sin Kim, Asan-si (KR); Byeong-Doo Kang, Asan-si (KR); Yong-Soon Lee, Cheonan-si (KR); Ock-Jin Kim, Asan-si (KR); Sang-Gon Lee, Daejeon (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 482 days.

(21) Appl. No.: 13/212,782

(22) Filed: Aug. 18, 2011

(65) Prior Publication Data

US 2012/0169578 A1 Jul. 5, 2012

(30) Foreign Application Priority Data

Dec. 29, 2010 (KR) ............................ 2010-0137584

(51) Int. Cl.
*G09G 3/36* (2006.01)
*G02F 1/1343* (2006.01)

(52) U.S. Cl.
CPC ............ *G09G 3/3688* (2013.01); *G09G 3/3648* (2013.01); *G09G 2300/0413* (2013.01); *G09G 2310/0232* (2013.01)
USPC ............................................ 345/87; 348/245

(58) Field of Classification Search
CPC ..... G02F 1/133; G02F 1/1333; G02F 1/1303; G02F 1/1345; G02F 1/13336; G02F 1/13454; G02F 1/136209; G02F 1/133308; G02B 6/0078; H01L 27/3293; H01L 27/3223; G09G 3/3648; G09G 2320/0223; G09G 2310/0232; G09G 2300/0413
USPC ............... 349/139, 149; 257/59; 345/87, 173, 345/103; 365/210.1; 348/245
See application file for complete search history.

(56) References Cited

U.S. PATENT DOCUMENTS

| | | | | |
|---|---|---|---|---|
| 6,104,465 | A * | 8/2000 | Na et al. | 349/152 |
| 6,373,544 | B1 * | 4/2002 | Hirabayashi | 349/149 |
| 6,522,379 | B1 * | 2/2003 | Ishihara et al. | 349/139 |
| 7,324,072 | B1 * | 1/2008 | Canova et al. | 345/55 |
| 2002/0097367 | A1 * | 7/2002 | Hirabayashi | 349/149 |

(Continued)

FOREIGN PATENT DOCUMENTS

| | | |
|---|---|---|
| JP | 2009-282272 | 12/2009 |
| KR | 10-2008-0043515 | 5/2008 |
| KR | 0945585 | 2/2010 |

OTHER PUBLICATIONS

English Abstract for Publication No.: 10-2008-0043515.

(Continued)

*Primary Examiner* — Michael J Eurice

(74) *Attorney, Agent, or Firm* — F. Chau & Associates, LLC

(57) ABSTRACT

A display panel includes a plurality of data lines, a plurality of gate lines, a plurality of dummy loads, a pad portion and a fanout portion. The data lines are disposed in a display area, on which a plurality of pixels are disposed. The gate lines are disposed in the display area and cross the data lines. The dummy loads are disposed in a peripheral area surrounding the display area. The pad portion is disposed in the peripheral area and includes signal pads and dummy pads. The fanout portion includes a first fanout line portion connecting the data lines to the signal pads, and a second fanout line portion connecting the dummy loads to the dummy pads.

12 Claims, 7 Drawing Sheets

(56) References Cited

U.S. PATENT DOCUMENTS

| | | | | |
|---|---|---|---|---|
| 2003/0122495 | A1* | 7/2003 | Nakanishi | 315/169.3 |
| 2003/0146710 | A1* | 8/2003 | Nakanishi | 315/169.3 |
| 2004/0239667 | A1* | 12/2004 | Takahashi | 345/212 |
| 2006/0050205 | A1* | 3/2006 | Yang et al. | 349/98 |
| 2006/0170854 | A1* | 8/2006 | Han et al. | 349/153 |
| 2008/0179593 | A1* | 7/2008 | Lim et al. | 257/59 |
| 2008/0278644 | A1* | 11/2008 | Fukami et al. | 349/37 |
| 2009/0102824 | A1* | 4/2009 | Tanaka et al. | 345/205 |
| 2010/0053131 | A1* | 3/2010 | Handa et al. | 345/206 |
| 2010/0110058 | A1* | 5/2010 | Moh et al. | 345/211 |
| 2010/0295830 | A1* | 11/2010 | Chen | 345/206 |
| 2011/0032421 | A1* | 2/2011 | Kota | 348/500 |
| 2011/0115765 | A1* | 5/2011 | Chang | 345/206 |
| 2011/0183479 | A1* | 7/2011 | Lim et al. | 438/158 |

OTHER PUBLICATIONS

English Abstract for Publication No.: 2009-282272.
English Abstract for Publication No.: 0945585.

* cited by examiner

DISPLAY PANEL AND DISPLAY APPARATUS HAVING THE SAME

CROSS-REFERENCE TO RELATED APPLICATION

This application claims priority under 35 U.S.C. §119 to Korean Patent Application No. 10-2010-0137584, filed on Dec. 29, 2010, the disclosure of which is hereby incorporated by reference herein in it's entirety.

BACKGROUND OF THE INVENTION

1. Technical Field

Example embodiments of the present invention relate to a display panel and a display apparatus. More particularly, example embodiments of the present invention relate to a display panel used for a display apparatus and a display apparatus having the display panel.

2. Description of the Related Art

A liquid crystal display (LCD) apparatus is a flat panel display apparatus which may display an image using a liquid crystal (LC). The LCD apparatus may include a display panel displaying an image and a panel driver driving the display panel. The panel driver may include a data driver for driving data lines formed on the display panel, and a gate driver for driving gate lines formed on the display panel.

Recently, to decrease the size of the LCD apparatus and increase productivity, the gate driver has been integrated on the display panel in an amorphous silicon gate (ASG) type, and the data driver has been directly mounted on the display panel as a chip type, which is called a chip on glass (COG) method.

The number of data driving chips mounted on the display panel is determined by the resolution of the display panel and the number of channels. For example, when a resolution of the display panel is 1366×768, 4098, which is 1366×3(R, G, B), data lines are formed on the display panel, and eight data driving chips respectively having 516 channels may be used for driving the data lines. The driving chip may include, for example, 486 channels connected to the data lines and 30 channels not connected to the data lines, which are called dummy channels.

The data driving chip may provide a signal to the dummy channels. When the signal is applied to the dummy channel not connected to a load, the output of the last driving chip may be oscillated. Due to the oscillation, the display panel may generate a display error such as a horizontal line error.

SUMMARY OF THE INVENTION

Example embodiments of the present invention provide a display panel having increased display quality.

Example embodiments of the present invention also provide a display apparatus having the display panel.

In an example embodiment of the present invention, a display panel includes a plurality of data lines, a plurality of gate lines, a plurality of dummy loads, a pad portion and a fanout portion. The data lines are disposed in a display area, on which a plurality of pixels are disposed. The gate lines are disposed in the display area and cross the data lines. The dummy loads are disposed in a peripheral area surrounding the display area. The pad portion is disposed in the peripheral area and includes signal pads and dummy pads. The fanout portion includes a first fanout line portion connecting the data lines to the signal pads, and a second fanout line portion connecting the dummy loads to the dummy pads.

In an example embodiment, the second fanout line portion may include a plurality of fanout connecting lines and a fanout line. The fanout connecting lines may divide the dummy pads and the signal pads into a plurality of groups. The fanout line may connect the fanout connecting line to the dummy loads.

In an example embodiment, each group of the dummy pads may receive signals having the same polarity.

In an example embodiment, the fanout connecting lines may include a first fanout connecting line connecting odd-numbered dummy pads among the dummy pads and a second fanout connecting line connecting even-numbered dummy pads among the dummy pads.

In an example embodiment, each of the dummy loads may include a dummy data line disposed parallel to the data lines, a dummy pixel electrode electrically connected to the dummy data line and the gate line extended from the display area.

In an example embodiment, each of the dummy loads may be a dummy data line disposed parallel to the data lines.

In an example embodiment, the dummy data line may be at least one of longer than the data lines and narrower than the data lines.

In an example embodiment, the dummy data line may have zigzag patterns.

In an example embodiment of the present invention, a display apparatus includes a display panel, a data driving chip and a gate driver. The display panel includes a plurality of data lines and a plurality of gate lines disposed in a display area and crossing with each other, a plurality of dummy loads disposed in a peripheral area surrounding the display area, a pad portion disposed in the peripheral area and including signal pads and dummy pads, and a fanout portion including a first fanout line portion connecting the data lines to the signal pads and a second fanout line portion connecting the dummy loads to the dummy pads. The data driving chip outputs a data signal to the data lines and a dummy data signal to the dummy loads. The gate driver outputs a gate signal to the gate lines.

In an example embodiment, the second fanout line portion may include a plurality of fanout connecting lines and a fanout line. The fanout connecting lines may divide the dummy pads and the signal pads into a plurality of groups. The fanout line may connect the fanout connecting line to the dummy loads.

In an example embodiment, the data driving chip may provide a dummy data signal inverted in every line. The fanout connecting lines may divide the dummy pads into groups so that each group of the dummy pads may receive signals having the same polarity.

In an example embodiment, each of the dummy loads may include a dummy data line disposed parallel to the data lines, a dummy pixel electrode electrically connected to the dummy data line and the gate line extended from the display area.

In an example embodiment, each of the dummy loads may be a dummy data line disposed parallel to the data lines.

In an example embodiment, the dummy data line may be longer than the data lines, or narrower than the data lines.

In an example embodiment, the dummy data line may have zigzag patterns.

In an example embodiment, the data driving chip may be mounted on the pad portion.

In an example embodiment, the data driving chip may transmit a data control signal to an adjacent data driving chip in a cascade connection.

In another example embodiment of the present invention, a display apparatus includes a display panel including a display area and a peripheral area surrounding the display area. The peripheral area includes a first peripheral area, a second peripheral area and a third peripheral area.

The display apparatus further includes a plurality of data lines and a plurality of gate lines disposed in the display area and crossing with each other and the gate lines extend from the display area, a dummy load part disposed in the third peripheral area and includes a first dummy pixel column and a second dummy pixel column. The first dummy pixel column includes a first dummy data line, the gate lines extended from the display area, first dummy switching elements electrically connected to the first dummy data line and the gate lines extended from the display area and first dummy pixel electrodes electrically connected to the first dummy switching elements. The dummy data line is disposed adjacently to at least one of the data lines in the display area. The second dummy pixel column includes a second dummy data line disposed adjacently to the first dummy data line, the gate lines extended from the display area, second dummy switching elements electrically connected to the second dummy data line and the gate lines extended from the display area and second dummy pixel electrodes electrically connected to the second dummy switching elements, a pad portion disposed in the third peripheral area and including signal pads and dummy pads, and a fanout portion including a first fanout line portion connecting the data lines to the signal pads and a second fanout line portion including a plurality of fanout connecting lines dividing the dummy pads and the signal pads into at least a first group and a second group and a fanout line connecting the fanout connecting lines to the first and second dummy data lines.

The first group of the plurality of groups of the dummy pads are connected to the first dummy data line of the first dummy pixel column and the second group of the dummy pads are connected to the second dummy data line of the second dummy pixel column. The display apparatus further includes a data driving chip outputting a data signal to the data lines and a dummy data signal to the first and second dummy pixel columns of the dummy load part and a gate driver disposed in at least one of the second peripheral region and the third peripheral region and outputting a gate signal to the gate lines extended from the display area.

According to example embodiments of the present invention, a display panel and a display apparatus having the display panel, dummy pads receiving dummy signals are electrically connected to dummy loads so that a display error such as a horizontal line error may be prevented.

BRIEF DESCRIPTION OF THE DRAWINGS

Example embodiments of the present invention can be understood in more detail from the following detailed description taken in conjunction with the accompanying drawings, in which.

DETAILED DESCRIPTION OF EXAMPLE EMBODIMENTS OF THE INVENTION

Hereinafter, example embodiments of the present invention will be explained in detail with reference to the accompanying drawings.

Figure 1:
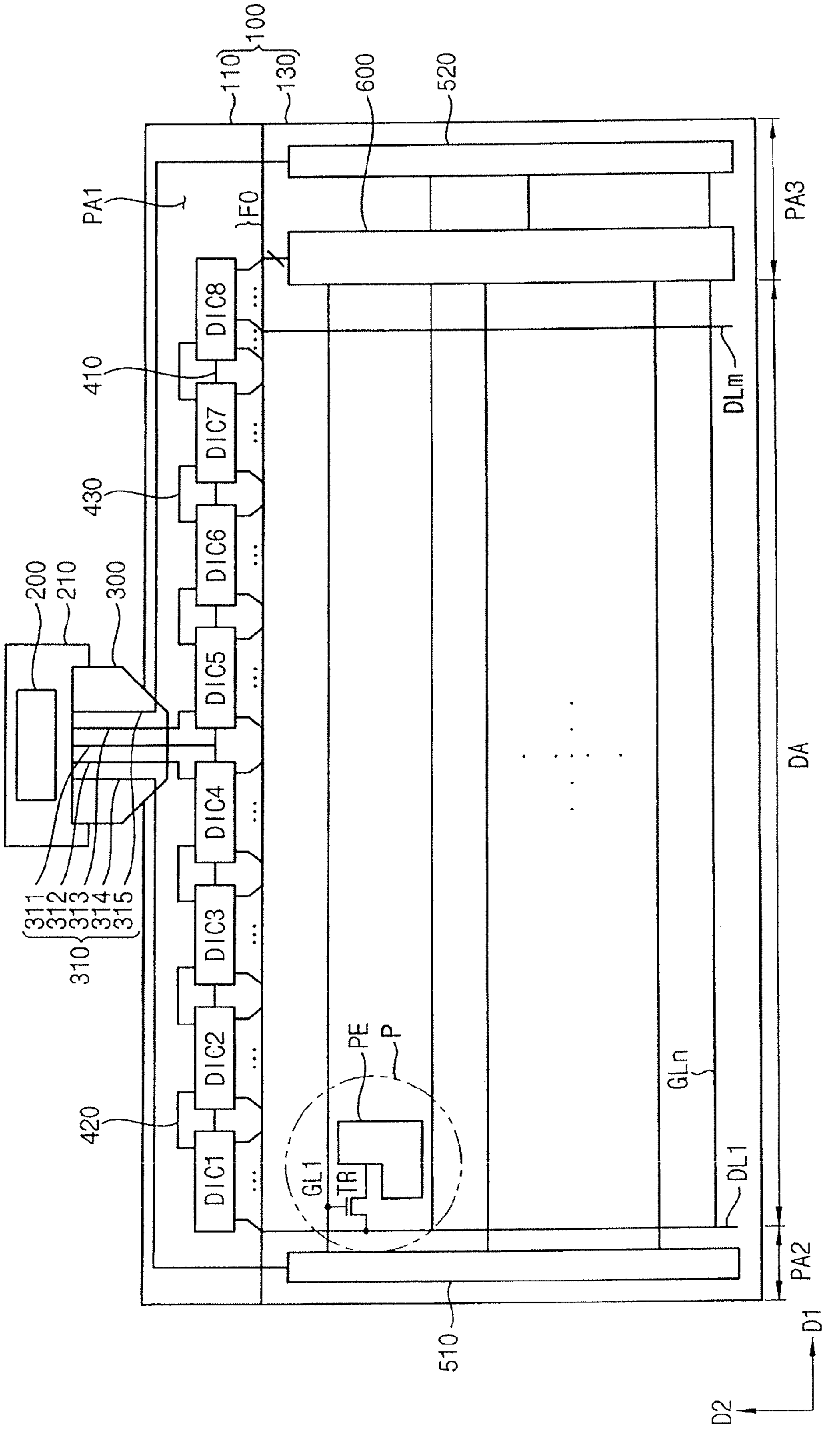
FIG. 1 is a plan view illustrating a display apparatus according to an example embodiment of the present invention.

FIG. 1 is a plan view illustrating a display apparatus according to an example embodiment of the present invention.

Referring to FIG. 1, the display apparatus according to an example embodiment of the present invention includes, for example, a display panel 100, a main driving circuit 200, a source printed circuit board 210, a flexible printed circuit board 300, a plurality of data driving chips DIC1 to DIC8, a first gate driver 510, a second gate driver 520, a dummy load part 600 and a fanout portion FO.

The display panel 100 may include a display substrate 110, an opposite substrate 130 facing the display substrate 110 and a liquid crystal layer (not shown) disposed between the display substrate 110 and the opposite substrate 130. The display panel 100 may include, for example, a display area DA and first, second and third peripheral areas PA1, PA2 and PA3.

A plurality of gate lines GL1 to GLn, a plurality of data lines DL1 to DLm and a plurality of pixels P may be formed in the display area DA. The gate lines GL1 to GLn extends in, for example, a first direction D1. The gate lines GL1 to GLn are disposed, for example, in a second direction D2 crossing the first direction D1. The data lines DL1 to DLm extends, for example, in the second direction D2. The data lines DL1 to DLm are disposed, for example, in the first direction D1. It is noted that example embodiments of the present invention are not limited to the above-mentioned specific directions and positions for the gate lines GL1 to GLn and the data lines DL1 to DLm but rather the positions and directions for the gate lines GL1 to GLn and the data lines DL1 to DLm in the display apparatus may be varied in accordance with example embodiments of the present invention as is understood by one skilled in art. The pixel P includes a switching element TR electrically connected to the gate line and the data line, and a pixel electrode PE electrically connected to the switching element TR.

The main driving circuit 200 controls the driving timing of the display apparatus based on a control signal received from outside. The main driving circuit 200 is mounted on the source printed circuit board 210. The main driving circuit 200 generates a data control signal to control the driving of the data driving chips DIC1 to DIC8 based on the control signal. The main driving circuit 200 generates a gate control signal to control the driving of the first and second gate drivers 510 and 520 based on the control signal.

The source printed circuit board 210 is electrically connected to the flexible printed circuit board 300. The source printed circuit board 210 is electrically connected to the display panel 100 through the flexible printed circuit board 300.

The data driving chips DIC1 to DIC8 output a data signal to the data lines DL1 to DLm based on the data control signal provided from the main driving circuit 200. In the present example embodiment, though eight data driving chips are used to drive the display panel 100 having a resolution of 1366×768, example embodiments of the present invention are not limited thereto. The number of the data driving chips may be varied according to a resolution of the display panel 100 and the number of channels of each data driving chip.

Figure 2A:
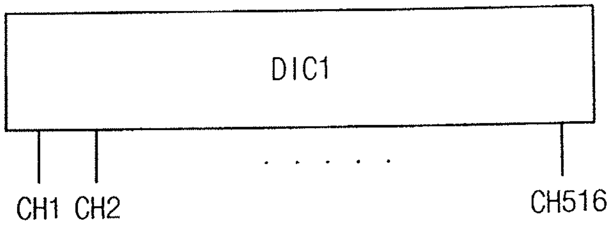
FIGS. 2A and 2B are conceptual diagrams illustrating data driving chip of FIG. 1.
Figure 2B:
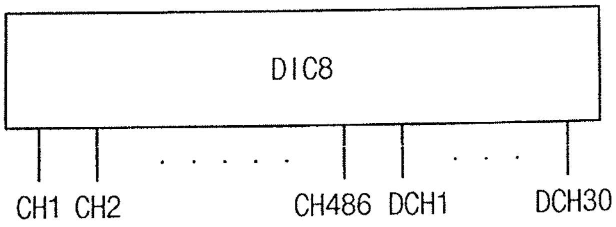

FIGS. 2A and 2B are conceptual diagrams illustrating data driving chip of FIG. 1.

Referring to FIG. 2A, a first data driving chip DIC1 includes 516 output channels CH1 to CH516. The output channels CH1 to CH516 output the data signals. Although not shown in the figures, second, third, fourth, fifth, sixth and seventh data driving chips DIC2, DIC3, DIC4, DIC5, DIC6 and DIC7 may respectively include 516 output channels CH1 to CH516 like the first data driving chip DIC1.

Referring to FIG. 2B, an eighth data driving chip DIC8 includes 486 output channels CH1 to CH486 and 30 dummy channels DCH1 to DCH30. The output channels CH1 to CH486 output the data signals. The dummy channels DCH1 to DCH30 output dummy data signals. The dummy data signals may have substantially the same value as each other. However, example embodiments of the present invention are not limited to the above configuration but rather the number of the output channels of the data driving chips DIC1, DIC2, DIC3, DIC4, DIC5, DIC6, DIC7, DIC8 and the number of dummy channels of the data driving chips DIC8 may be varied according to the desired resolution of the display panel 100.

Although not shown in figures, a plurality of pad portions is formed in the first peripheral area PA1. The data driving chips DIC1 to DIC8 are respectively mounted on the pad portions. First to seventh pad portions connected to the first to seventh data driving chips DIC1 to DIC7 include signal pads electrically connected to the output channels CH1 to CH516 to receive the data signals. Meanwhile, an eighth pad portion connected to the eighth data driving chip DIC8 include signal pads connected to the output channels CH1 to CH486 to receive the data signals, and dummy pads connected to the dummy channels DCH1 to DCH30 to receive the dummy data signals.

The first gate driver 510 is integrated on the second peripheral area PA2. The first gate driver 510 is electrically connected to odd-numbered gate lines among the gate lines GL1 to GLn to sequentially output the gate signals to the odd-numbered gate lines.

The second gate driver 520 is integrated on the third peripheral area PA3. The second gate driver 520 is electrically connected to even-numbered gate lines among the gate lines GL1 to GLn to sequentially output the gate signals to the even-numbered gate lines. Alternatively, in other example embodiments, for example, the first gate driver 510 may be electrically connected to even-numbered gate lines among the gate lines GL1 to GLn to sequentially output the gate signals to the even-numbered gate lines and the second gate driver 520 may be electrically connected to odd-numbered gate lines among the gate lines GL1 to GLn to sequentially output the gate signals to the odd-numbered gate lines In the present example embodiment, though the first and second gate drivers 510 and 520 are integrated on the display panel 100, example embodiments of the present invention are not limited thereto. For example, first and second gate drivers 510 and 520 may be mounted on the second and third peripheral areas PA2 and PA3 as a chip type.

In the present example embodiment, though the gate driver is divided into two gate drivers 510 and 520 disposed in both side portions of the display panel 100, the present invention is not limited thereto. The gate driver may be disposed, for example, in a single side portion of the display panel 100.

The dummy load part 600 is disposed in the third peripheral area PA3. The dummy load part 600 is electrically connected to the dummy channels DCH1 to DCH30 of the eighth data driving chip DIC8.

The fanout portion FO is disposed in the first peripheral area PA1. The fanout portion FO electrically connects the signal pads of the pad portion to the data lines DL1 to DLm. In addition, the fanout portion FO connects the dummy pads to the dummy load part 600. The dummy load part 600 and the fanout portion FO may be explained in detail referring to FIG. 3.

Power line 410 and first and second connecting lines 420 and 430 are disposed in the first peripheral area PA1. The power line 410 is connected to the data driving chips DIC1 to DIC8. The data driving chips DIC1 to DIC8 receive a power signal through the power line 410 in, for example, a cascade connection.

The first connecting line 420 electrically connects the first to fourth data driving chips DIC1 to DIC4 to each other. The second connecting line 430 electrically connects the fifth to eighth data driving chips DIC5 to DIC8 to each other.

A signal line portion 310 is disposed on the flexible printed circuit board 300. The signal line portion 310 includes a plurality of signal lines 311, 312, 313, 314 and 315 transmitting signals from the main driving circuit 200 to the data driving chips DIC1 to DIC8 and the first and second gate drivers 510 and 520. For example, the signal line portion 310 may include a first signal line 311 electrically connected to the power line 410, a second signal line 312 transmitting the data control signal to the first to fourth data driving chips DIC1 to DIC4, a third signal line 313 transmitting the data control signal to the fifth to eighth data driving chips DIC5 to DIC8, a fourth signal line 314 transmitting the gate signal to the first gate driver 510 and a fifth signal line 315 transmitting the gate signal to the second gate driver 520.

The second signal line 312 is electrically connected to the fourth data driving chip DIC4. The fourth data driving chip DIC4 receives the data control signal through the second signal line 312. The first to third data driving chips DIC1 to DIC3 receives the data control signal from adjacent data driving chips through the first connecting line 420 in, for example, a cascade connection.

The third signal line 313 is electrically connected to the fifth data driving chip DIC5. The fifth data driving chip DIC5 receives the data control signal through the third signal line 313. The sixth to eighth data driving chips DICE to DIC8 receives the data control signal from adjacent data driving chips through the second connecting line 430 in, for example, a cascade connection.

Figure 3:
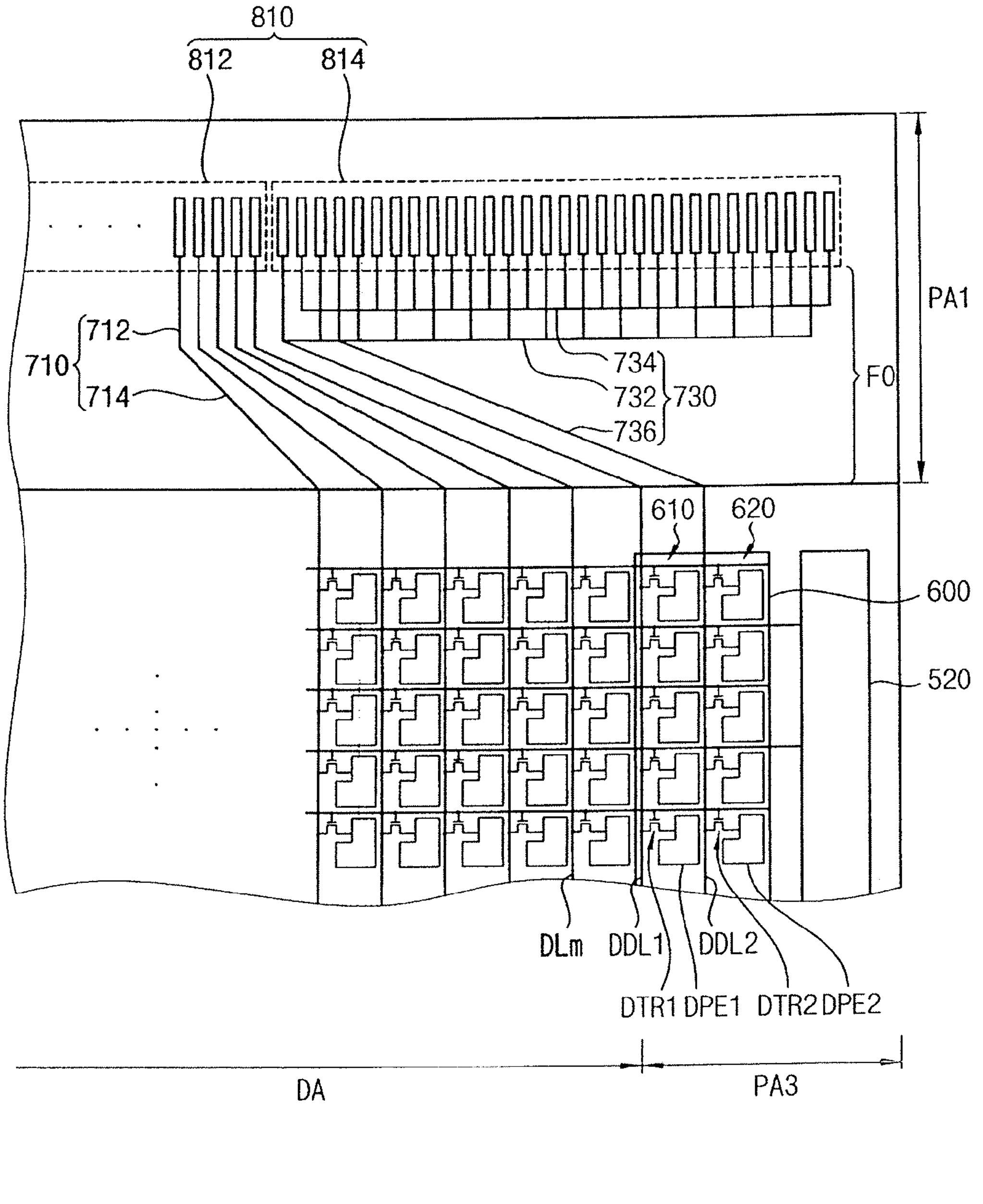
FIG. 3 is a partially enlarged plan view illustrating a display panel of FIG. 1.

FIG. 3 is a partially enlarged plan view illustrating a display panel of FIG. 1.

Referring to FIGS. 1 and 3, an eighth pad portion 810 is disposed in the first peripheral area PA1. The eighth data driving chip DIC8 is mounted on the eighth pad portion 810. The eighth pad portion 810 includes signal pads 812 and dummy pads 814. The signal pads 812 are connected to output channels of the eighth data driving chip DIC8. The dummy pads 814 are connected to dummy channels of the eighth data driving chip DIC8.

The dummy load part 600 is disposed in the third peripheral area PA3. The dummy load part 600 may include, for example, first and second dummy pixel columns 610 and 620. The first dummy pixel column 610 may include, for example, a first dummy data line DDL1, the gate lines GL1 to GLn extended from the display area DA, first dummy switching elements DTR1 electrically connected to the first dummy data line DDL1 and the gate lines GL1 to GLn and first dummy pixel electrodes DPE1 electrically connected to the first dummy switching elements DTR1. The first dummy data line DDL1 is disposed adjacent to last data line DLm in the display area DA.

The second dummy pixel column 620 may include, for example, a second dummy data line DDL2 disposed adjacent to the first dummy data line DDL1, the gate lines GL1 to GLn extended from the display area DA, second dummy switching elements DTR2 electrically connected to the second dummy data line DDL2 and the gate lines GL1 to GLn and second dummy pixel electrodes DPE2 electrically connected to the second dummy switching elements DTR2.

The fanout portion FO is disposed in the first peripheral area PA1. The fanout portion FO includes, for example, a first fanout line portion 710 and a second fanout line portion 730. The first fanout line portion 710 electrically connects the signal pads 812 to the data lines. The first fanout line portion 710 may include, for example, a vertical portion 712 extends in a vertical direction, and an inclined portion 714 that extends in an inclined direction.

The second fanout line portion 730 includes first and second fanout connecting lines 732 and 734 and fanout line 736. The dummy pads 814 may be divided into, for example, two groups by the first and second fanout connecting lines 732 and 734. Thus, each group of the dummy pads 814 receives signals having the same polarity. For example, when the dummy data signal is inverted in every line, the first fanout connecting line 732 electrically connects odd-numbered dummy pads among the dummy pads 814, and the second fanout connecting line 734 electrically connects even-numbered dummy pads among the dummy pads 814. However, example embodiments of the present invention are not limited to the above configuration, but rather in other example embodiments, for example, when the dummy data signal is inverted in every line, the first fanout connecting line 732 may electrically connect even-numbered dummy pads among the dummy pads 814, and the second fanout connecting line 734 may electrically connect odd-numbered dummy pads among the dummy pads 814.

The dummy pads 814 receive dummy data signals having the same level. When the dummy data signals having different levels are received by the dummy pads 814, current flow may occur from the dummy pad receiving a high level dummy data signal to the dummy pad receiving a low level dummy data signal in the above connection structure, so that the eighth data driving chip DIC8 may be damaged.

The fanout line 736 respectively connects the first and second fanout connecting lines 732 and 734 to the first and second dummy data lines DDL1 and DDL2. A first group of the dummy pads 814 is connected to the first dummy data line DDL1. A second group of the dummy pads 814 is connected to the second dummy data line DDL2.

According to the present example embodiment, the dummy pads 814 are connected to the dummy pixel columns 610 and 620 so that an output of the driving chip may be prevented from oscillating which occurs when a dummy signal is applied to the dummy pads 814 not connected to a dummy load.

Figure 4:
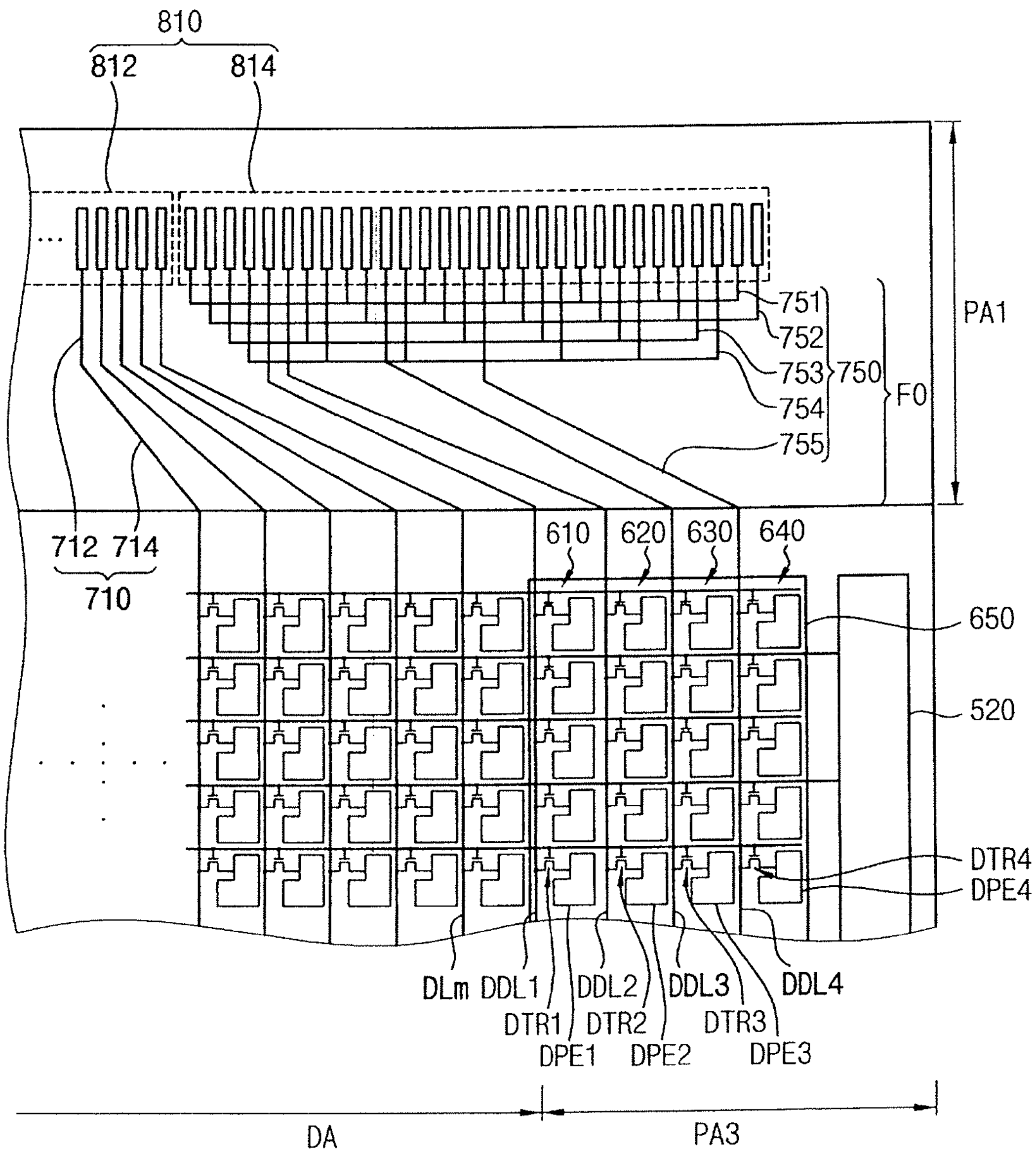
FIG. 4 is a partially enlarged plan view illustrating a display panel according to an example embodiment of the present invention.

FIG. 4 is a partially enlarged plan view illustrating a display panel according to another example embodiment of the present invention.

The display apparatus according to the present example embodiment is substantially the same as the display apparatus according to the previous example embodiment of FIG. 1 except for the display panel. Thus, the same reference numerals will be used to refer to the same or like parts as those described in the previous example embodiment of FIG. 1 and any repetitive explanation concerning the above elements will be omitted.

Referring to FIGS. 1 and 4, an eighth pad portion 810 is disposed in the first peripheral area PA1. The eighth data driving chip DIC8 is mounted on the eighth pad portion 810. The eighth pad portion 810 includes signal pads 812 and dummy pads 814. The signal pads 812 are connected to output channels of the eighth data driving chip DIC8. The dummy pads 814 are connected to dummy channels of the eighth data driving chip DIC8.

The dummy load part 650 is disposed in the third peripheral area PA3. The dummy load part 650 may include, for example, first, second, third and fourth dummy pixel columns 610, 620, 630 and 640. The first dummy pixel column 610 may include, for example, a first dummy data line DDL1, the gate lines GL1 to GLn extended from the display area DA, first dummy switching elements DTR1 electrically connected to the first dummy data line DDL1 and the gate lines GL1 to GLn and first dummy pixel electrodes DPE1 electrically connected to the first dummy switching elements DTR1. The first dummy data line DDL1 is disposed adjacent to last data line DLm in the display area DA.

The second dummy pixel column 620 may include, for example, a second dummy data line DDL2 disposed adjacent to the first dummy data line DDL1, the gate lines GL1 to GLn extended from the display area DA, second dummy switching elements DTR2 electrically connected to the second dummy data line DDL2 and the gate lines GL1 to GLn and second dummy pixel electrodes DPE2 electrically connected to the second dummy switching elements DTR2.

The third dummy pixel column 630 may include, for example, a third dummy data line DDL3 disposed adjacent to the second dummy data line DDL2, the gate lines GL1 to GLn extended from the display area DA, third dummy switching elements DTR3 electrically connected to the third dummy data line DDL3 and the gate lines GL1 to GLn and third dummy pixel electrodes DPE3 electrically connected to the third dummy switching elements DTR3.

The fourth dummy pixel column 640 may include, for example, a fourth dummy data line DDL4 disposed adjacent to the third dummy data line DDL3, the gate lines GL1 to GLn extended from the display area DA, fourth dummy switching elements DTR4 electrically connected to the fourth dummy data line DDL4 and the gate lines GL1 to GLn and fourth dummy pixel electrodes DPE4 electrically connected to the fourth dummy switching elements DTR4.

The fanout portion FO is disposed in the first peripheral area PA1. The fanout portion FO includes, for example, a first fanout line portion 710 and a second fanout line portion 750. The first fanout line portion 710 electrically connects the signal pads 812 to the data lines. The first fanout line portion 710 may include, for example, a vertical portion 712 that extends in a vertical direction, and an inclined portion 714 that extends in an inclined direction.

The second fanout line portion 750 includes, for example, first, second, third and fourth fanout connecting lines 751 to 754 and fanout line 755. The dummy pads 814 may be divided into, for example, four groups by the first to fourth fanout connecting lines 751 to 754. Thus, each group of the dummy pads 814 receives signals having the same polarity. For example, the eighth driving chip DIC8 may drive the data lines DL1 to DLm and the first to fourth dummy data lines DDL1 to DDL4 in line inversion method. The first fanout connecting line 751 may be electrically connected to first, fifth, ninth, 13th, 17th, 21st, 25th and 29th dummy pads among the dummy pads 814. The second fanout connecting line 752 may be electrically connected to second, sixth, tenth, 14th, 18th, 22nd, 26th and 30th dummy pads among the dummy pads 814. The third fanout connecting line 753 may be electrically connected to third, seventh, 11th, 15th, 19th, 23rd and 27th dummy pads among the dummy pads 814. The fourth fanout connecting line 754 may be electrically connected to fourth, eighth, 12nd, 16th, 20th, 24th and 28th dummy pads among the dummy pads 814. The number of the dummy pads 814 in each group may be different from each other. The dummy pads 814 receive dummy data signals having the same level.

The fanout line 755 respectively connects the first to fourth fanout connecting lines 751 to 754 to the first to fourth dummy data lines DDL1 to DDL4. A first group of the dummy pads 814 grouped by the first fanout connecting line 751 is connected to the first dummy data line DDL1. A second group of the dummy pads 814 grouped by the second fanout connecting line 752 is connected to the second dummy data line DDL2. A third group of the dummy pads 814 grouped by the third fanout connecting line 753 is connected to the third dummy data line DDL3. A fourth group of the dummy pads 814 grouped by the fourth fanout connecting line 754 is connected to the fourth dummy data line DDL4.

According to the present example embodiment, the dummy pads 814 are divided into four groups, and connected to four dummy pixel columns 610, 620, 630, 640, so that a level of a load of each dummy pixel columns 610, 620, 630, 640 may be decreased. Thus, the dummy pixel columns 610, 620, 630, 640 may be readily formed.

Figure 5:
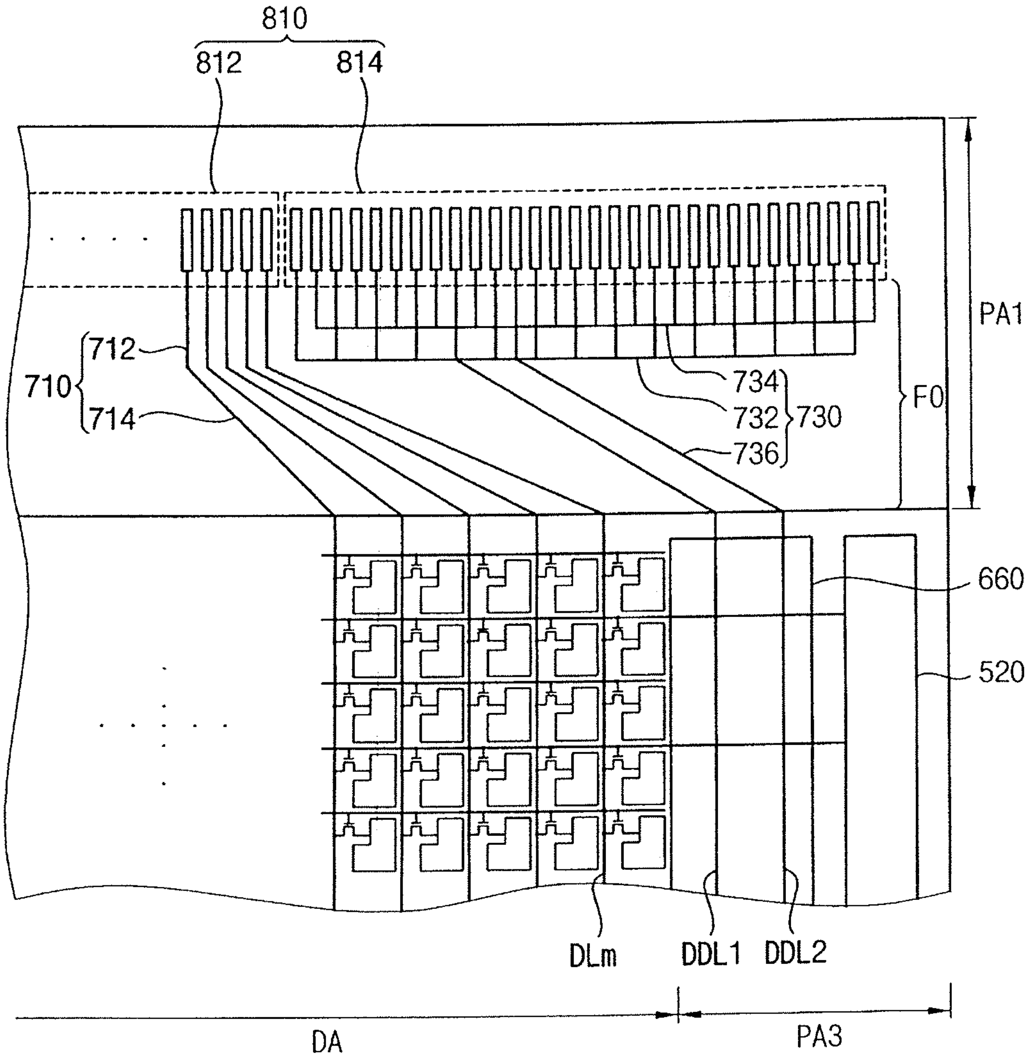
FIG. 5 is a partially enlarged plan view illustrating a display panel according to an example embodiment of the present invention.

FIG. 5 is a partially enlarged plan view illustrating a display panel according to still another example embodiment of the present invention.

The display apparatus according to the present example embodiment is substantially the same as the display apparatus according to the previous example embodiment of FIG. 1 except for the display panel. Thus, the same reference numerals will be used to refer to the same or like parts as those described in the previous example embodiment of FIG. 1 and any repetitive explanation concerning the above elements will be omitted. In addition, the display panel according to the present example embodiment is substantially the same as the display panel according to the previous example embodiment of FIG. 3 except for a dummy load part 660. Thus, the same reference numerals will be used to refer to the same or like parts as those described in the previous example embodiment of FIG. 3 and any repetitive explanation concerning the above elements will be omitted.

Referring to FIGS. 1 and 5, an eighth pad portion 810 is disposed in the first peripheral area PAL The eighth data driving chip DIC8 is mounted on the eighth pad portion 810. The eighth pad portion 810 includes signal pads 812 and dummy pads 814.

The dummy load part 660 is disposed in the third peripheral area PA3. The dummy load part 660 may include, for example, first and second dummy data lines DDL1 and DDL2. The first and second dummy data lines DDL1 and DDL2 are disposed substantially parallel to the data lines DL1 to DLm disposed in the display area DA. The first dummy data line DDL1 is disposed adjacent to last data line DLm in the display area DA. The second dummy data line DDL2 is disposed adjacent to the first dummy data line DDL1.

The first and second dummy data lines DDL1 and DDL2 may be formed in a condition different from the data lines DL1 to DLm. For example, the first and second dummy data lines DDL1 and DDL2 may be longer than the data lines DL1 to DLm or may be narrower than the data lines DL1 to DLm. For example, the first and second dummy data lines DDL1 and DDL2 should be formed considering the levels of the loads of each group of the dummy pads connected thereto through a second fanout line portion 730.

The first dummy data line DDL1 is electrically connected to a first group of dummy pads 814 through a first fanout connecting line 732 of the second fanout line portion 730. The second dummy data line DDL2 is electrically connected to a second group of dummy pads 814 through a second fanout connecting line 734 of the second fanout line portion 730.

According to the present example embodiment, a dummy load is formed as the dummy data line so that the dummy load is readily formed.

Figure 6:
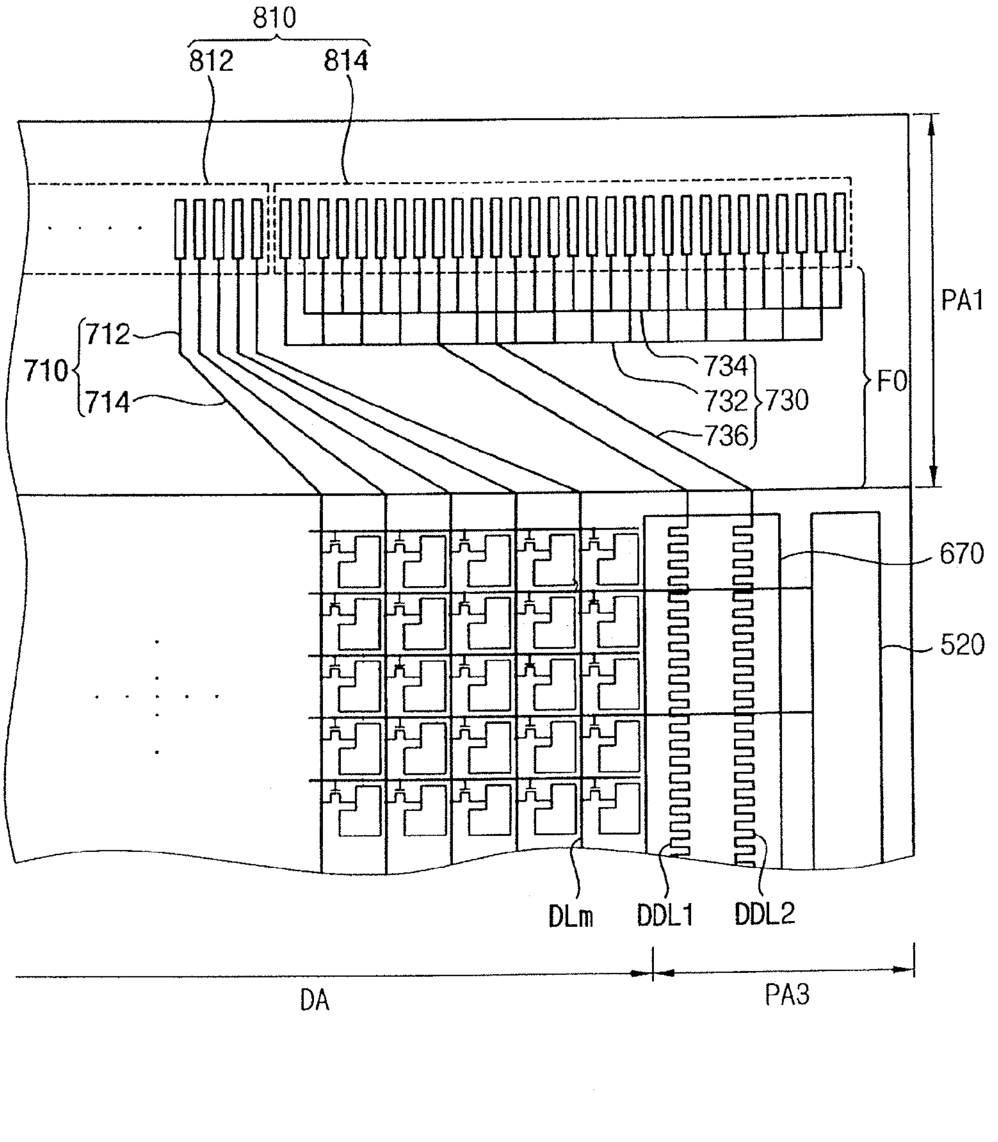
FIG. 6 is a partially enlarged plan view illustrating a display panel according to an example embodiment of the present invention.

FIG. 6 is a partially enlarged plan view illustrating a display panel according to still another example embodiment of the present invention.

The display apparatus according to the present example embodiment is substantially the same as the display apparatus according to the previous example embodiment of FIG. 1 except for the display panel. Thus, the same reference numerals will be used to refer to the same or like parts as those described in the previous example embodiment of FIG. 1 and any repetitive explanation concerning the above elements will be omitted. In addition, the display panel according to the present example embodiment is substantially the same as the display panel according to the previous example embodiment of FIG. 3 except for a dummy load part 670. Thus, the same reference numerals will be used to refer to the same or like parts as those described in the previous example embodiment of FIG. 3 and any repetitive explanation concerning the above elements will be omitted.

Referring to FIGS. 1 and 6, an eighth pad portion 810 is disposed in the first peripheral area PA1. The eighth data driving chip DIC8 is mounted on the eighth pad portion 810. The eighth pad portion 810 includes signal pads 812 and dummy pads 814.

The dummy load part 670 is disposed in the third peripheral area PA3. The dummy load part 670 may include, for example, first and second dummy data lines DDL1 and DDL2. The first and second dummy data lines DDL1 and DDL2 are disposed substantially parallel to the data lines DL1 to DLm disposed in the display area DA. The first dummy data line DDL1 is disposed adjacent to last data line DLm in the display area DA. The second dummy data line DDL2 is disposed adjacent to the first dummy data line DDL 1. The first and second dummy data lines DDL 1 and DDL2 may be formed in various shapes the considering levels of the loads of each group of the dummy pads 814 connected thereto through a second fanout line portion 730. For example, the first and second dummy data lines DDL1 and DDL2 may have zigzag patterns.

The first dummy data line DDL1 is electrically connected to a first group of dummy pads 814 through a first fanout connecting line 732 of the second fanout line portion 730. The second dummy data line DDL2 is electrically connected to a second group of dummy pads 814 through a second fanout connecting line 734 of the second fanout line portion 730.

According to the present example embodiment, the first and second dummy data lines DDL1 and DDL2 have the zigzag patterns so that lengths of the first and second dummy data lines DDL 1 and DDL2 are increased. Thus, each group of the dummy pads 814 may have a level of a load similar to that of each group of the dummy pads 814 connected to the first and second dummy pixel columns 610, 620 as explained in the previous example embodiment of FIG. 1.

Figure 7:
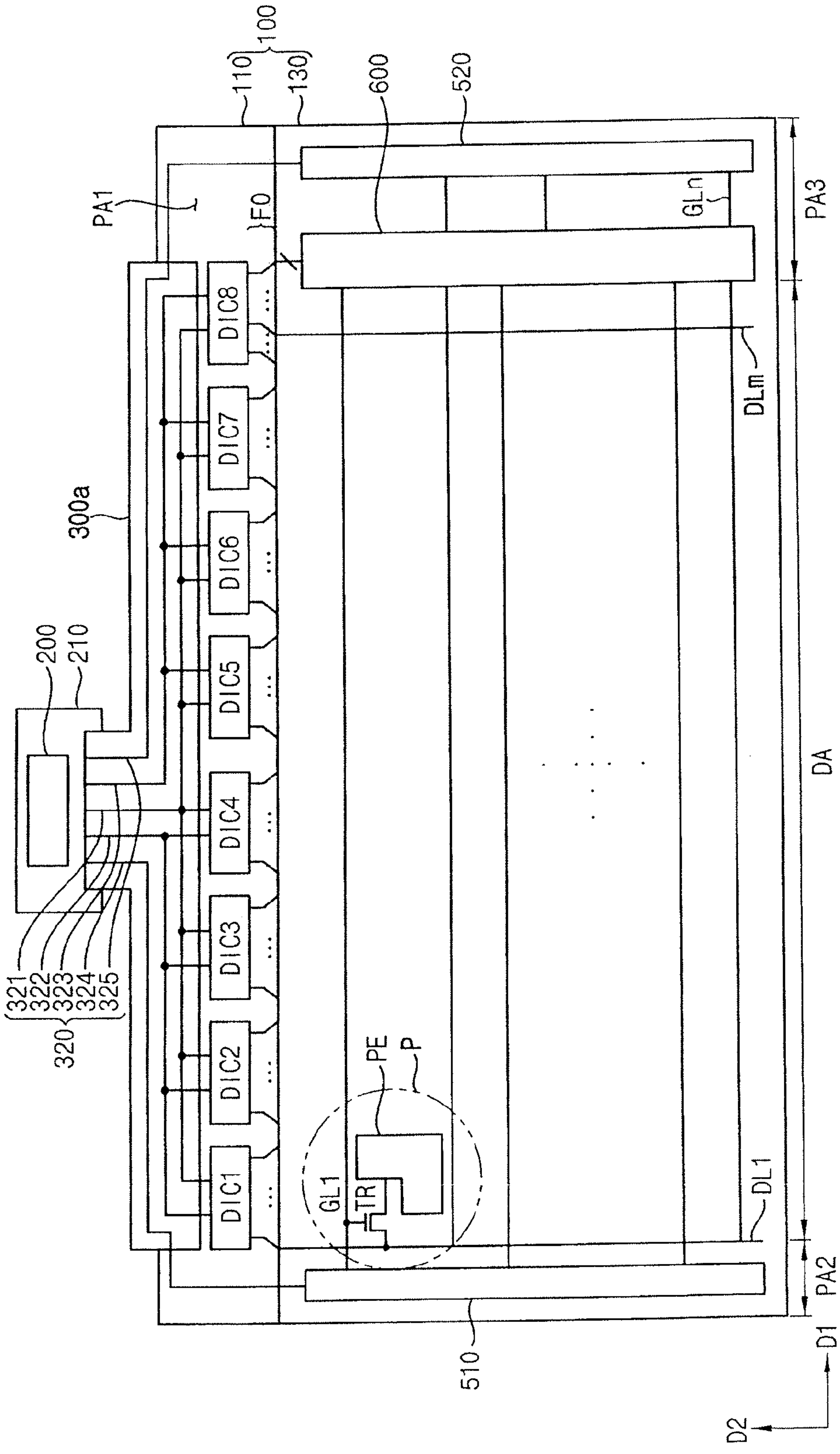
FIG. 7 is a plan view illustrating a display apparatus according to an example embodiment of the present invention.

FIG. 7 is a plan view illustrating a display apparatus according to still another example embodiment of the present invention.

The display apparatus according to the present example embodiment is substantially the same as the display apparatus according to the previous example embodiment of FIG. 1 except for a connection structure between data driving chips DIC1 to DIC8 and a main driving circuit 200. Thus, the same reference numerals will be used to refer to the same or like parts as those described in the previous example embodiment of FIG. 1 and any repetitive explanation concerning the above elements will be omitted.

Referring to FIG. 7, the display apparatus according to the present example embodiment includes, for example, a display panel 100, a main driving circuit 200, a source printed circuit board 210, a flexible printed circuit board 300*a*, a plurality of data driving chips DIC1 to DIC8, a first gate driver 510, a second gate driver 520, a dummy load part 600 and a fanout portion FO.

The main driving circuit 200 is mounted on the source printed circuit board 210. The main driving circuit 200 controls the driving timing of the display apparatus based on a control signal received from outside.

The source printed circuit board 210 is electrically connected to the flexible printed circuit board 300*a*. The source printed circuit board 210 is electrically connected to the display panel 100 through the flexible printed circuit board 300*a*.

A signal line portion 320 is disposed on the flexible printed circuit board 300*a*. For example, the signal line portion 320 may include a first signal line 321 transmitting a power signal to the data driving chips DIC1 to DIC8, a second signal line 322 transmitting the data control signal to the first to fourth data driving chips DIC1 to DIC4, a third signal line 323 transmitting the data control signal to the fifth to eighth data driving chips DIC5 to DIC8, a fourth signal line 324 transmitting the gate signal to the first gate driver 510 and a fifth signal line 325 transmitting the gate signal to the second gate driver 520.

Unlike the data driving chips receiving a power signal through the power line 410 (in FIG. 1) disposed in the first peripheral area PA1 of the display panel 100 in a cascade connection according to the previous example embodiment of FIG. 1, the first to eighth data driving chips DIC1 to DIC8 according to the present example embodiment directly receive a power signal through the first signal line 321 on the flexible printed circuit board 300*a*. In addition, the first to fourth data driving chips DIC1 to DIC4 directly receive the data control signal through the second signal line 322, and the fifth to eighth data driving chips DIC5 to DIC8 directly receive the data control signal through the third signal line 323.

The dummy load part 600 may include dummy loads. The dummy loads may be formed as first and second dummy pixel columns 610, 620 as shown in FIG. 3. In addition, the dummy loads may be formed as first to fourth dummy pixel columns 610, 620, 630, 640 as shown in FIG. 4. Furthermore, the dummy loads may be formed as the first and second dummy data lines as shown in FIGS. 5 and 6. The first and second dummy data lines DDL1, DDL2 may have, for example, zigzag patterns as shown in FIG. 6.

The fanout portion FO is disposed in the first peripheral area PAL The fanout portion FO electrically connects the signal pads of the pad portion to the data lines DL1 to DLm. The fanout portion FO electrically connects the dummy pads of the pad portion to the dummy loads. The fanout portion FO may include, for example, first and second fanout line portions 710 and 730 as shown in FIG. 3. The second fanout line portion 730 may include, for example, first and second fanout connecting lines 732 and 734 dividing the dummy pads 814 into two groups, and fanout line 736 electrically connecting the first and second fanout connecting lines 732 and 734 to the dummy loads.

Alternatively, the fanout portion FO may include first and second fanout line portions 710 and 750 as shown in FIG. 4. The second fanout line portion 750 may include, for example, first to fourth fanout connecting lines 751 to 754 dividing the dummy pads 814 into four groups, and fanout line 755 electrically connecting the first to fourth fanout connecting lines 751 to 754 to the dummy loads.

Although not shown in figures, the display apparatus may further include a flexible printed circuit board on which the data driving chips DIC1 to DIC8 are mounted. The data driving chips DIC1 to DIC8 may be electrically connected to the display panel 100 through the flexible printed circuit board. Dummy pads connected to the data driving chip including dummy pads among the data driving chips DIC1 to DIC8 may be connected to the dummy loads. Characteristics of the dummy pads and the dummy loads and a connection structure between the dummy pads and the dummy loads may be substantially the same as the previous example embodiment explained referring to FIGS. 3 to 6. Thus, any repetitive explanation concerning the dummy pads and dummy loads will be omitted As explained above, according to example embodiments of the present invention, a dummy load is disposed in a peripheral area of the display panel, and dummy pads not connected to the data lines are connected to the dummy load so that an output of the driving chip may be prevented from oscillating which occurs when a dummy signal is applied to the dummy pads not connected to a dummy load. Thus, a display error such as a horizontal line error due to the oscillation may be prevented.

Having described example embodiments of the present invention, it is further noted that it is readily apparent to those of reasonable skill in the art that various modifications may be made without departing from the spirit and scope of the invention which is defined by the metes and bounds of the appended claims.

What is claimed is:

1. A display panel comprising:

a plurality of data lines disposed in a display area, on which a plurality of pixels are disposed;

a plurality of gate lines disposed in the display area and crossing the data lines;

a plurality of dummy loads disposed in a peripheral area adjacent to the display area, wherein the dummy loads include a plurality of dummy data lines adjacent to the data lines;

a pad portion disposed in the peripheral area and including signal pads and dummy pads; and a fanout portion including a first fanout line portion connecting the data lines to the signal pads, and a second fanout line portion connecting the dummy loads to the dummy pads, wherein the second fanout line portion includes:

a plurality of fanout connecting lines connecting the dummy pads with one another in a plurality of groups, wherein first fanout connecting lines are connected to a plurality of odd-numbered dummy pads in one of the groups, and second fanout connecting lines are connected to a plurality of even-numbered dummy pads in another one of the groups; and a plurality of fanout lines connecting the fanout connecting lines to the dummy data lines, wherein a first fanout line electrically connects one of the first fanout connecting lines to one of the dummy data lines, and a second fanout line electrically connects one of the second fanout connecting lines to another one of the dummy data lines, and wherein each of the dummy loads only include the dummy data lines, and wherein the dummy data lines are disposed parallel to the data lines, and wherein the dummy data lines are at least one of longer than the data lines and narrower than the data lines, and wherein the dummy data lines have zigzag patterns.

2. The display panel of claim 1, wherein each group of the dummy pads receives signals having the same polarity as each other.

3. The display panel of claim 1, wherein each of the fanout connecting lines includes:

a first fanout connecting line connecting the odd-numbered dummy pads among the dummy pads; and a second fanout connecting line connecting the even-numbered dummy pads among the dummy pads.

4. The display panel of claim 1, wherein the gate lines extend from the display area and the dummy data lines are disposed parallel to the data lines, and wherein each of the dummy loads further includes:

a dummy pixel electrode electrically connected to one of the dummy data lines and one of the gate lines extended from the display area.

5. A display apparatus comprising:

a display panel including a plurality of data lines and a plurality of gate lines disposed in a display area and crossing with each other, a plurality of dummy loads disposed in a peripheral area adjacent to the display area, wherein the dummy loads include a plurality of dummy data lines adjacent to the data lines, a pad portion disposed in the peripheral area and including signal pads and dummy pads, and a fanout portion including a first fanout line portion connecting the data lines to the signal pads and a second fanout line portion connecting the dummy loads to the dummy pads, wherein the second fanout line portion includes:

a plurality of fanout connecting lines which connect the dummy pads with one another in a plurality of groups, wherein first fanout connecting lines are connected to a plurality of odd-numbered dummy pads in one of the groups, and second fanout connecting lines are connected to a plurality of even-numbered dummy pads in another one of the groups;

a data driving chip outputting a data signal to the data lines and a dummy data signal to the dummy loads; and a gate driver outputting a gate signal to the gate lines, wherein each of the dummy loads only include the dummy data lines, and wherein the dummy data lines are disposed parallel to the data lines, wherein the dummy data lines are at least one of longer than the data lines and narrower than the data lines, and wherein the dummy data lines have zigzag patterns.

6. The display apparatus of claim 5, wherein the data driving chip provides a dummy data signal inverted in every line, the fanout connecting lines divides the dummy pads into the plurality of groups so that each group of the dummy pads receives signals having the same polarity as each other.

7. The display apparatus of claim 5, wherein the gate lines extend from the display area and the dummy data lines are disposed parallel to the data lines, and wherein each of the dummy loads further includes:

a dummy pixel electrode electrically connected to one of the dummy data lines and one of the gate lines extended from the display area.

8. The display apparatus of claim 5, wherein the data driving chip is mounted on the pad portion.

9. The display apparatus of claim 8, wherein the data driving chip comprises a plurality of data driving chips, wherein at least one of the data driving chips transmits a data control signal to an adjacent one of the data driving chips in a cascade connection.

10. A display apparatus comprising:

a display panel including a display area and a peripheral area surrounding the display area, wherein the peripheral area includes a first peripheral area, a second peripheral area and a third peripheral area;

a plurality of data lines and a plurality of gate lines each disposed in the display area and crossing with each other, and wherein the gate lines extend from the display area;

a dummy load part disposed in the third peripheral area and including a first dummy pixel column and a second dummy pixel column, the first dummy pixel column including a first dummy data line, the gate lines extended from the display area, first dummy switching elements electrically connected to the first dummy data line and the gate lines extended from the display area and first dummy pixel electrodes electrically connected to the first dummy switching elements, the first dummy data line being disposed adjacently to at least one of the data lines in the display area and wherein the second dummy pixel column includes a second dummy data line disposed adjacently to the first dummy data line, the gate lines extended from the display area, second dummy switching elements electrically connected to the second dummy data line and the gate lines extended from the display area and second dummy pixel electrodes electrically connected to the second dummy switching elements;

a pad portion disposed in the first peripheral area and including signal pads and dummy pads, and a fanout portion including a first fanout line portion connecting the data lines to the signal pads and a second fanout line portion including a plurality of fanout connecting lines dividing the dummy pads into at least a first group including a plurality of odd numbered dummy pads and a second group including a plurality of even numbered dummy pads; and a fanout line connecting the fanout connecting lines to the first and second dummy data lines, wherein the plurality of odd numbered dummy pads of the first group of the dummy pads are connected to the first dummy data line of the first dummy pixel column by the second fanout line portion and wherein the plurality of even numbered dummy pads of the second group of the dummy pads are connected to the second dummy data line of the second dummy pixel column by the second fanout line portion;

a data driving chip outputting a data signal to the data lines and a dummy data signal to the first and second dummy pixel columns of the dummy load part; and a gate driver disposed in at least one of the second peripheral region and the third peripheral region and outputting a gate signal to the gate lines extended from the display area.

11. The display apparatus of claim 10, wherein the dummy load part further includes a third dummy pixel column and a fourth dummy pixel column, wherein the third dummy pixel column includes a third dummy data line disposed adjacently to the second dummy data line, the gate lines extended from the display area, third dummy switching elements electrically connected to the third dummy data line and the gate lines extended from the display area and third dummy pixel electrodes electrically connected to the third dummy switching elements, and wherein the fourth dummy pixel electrodes includes a fourth dummy data line disposed adjacently to the third dummy data line, the gate lines extended from the display area, fourth dummy switching elements electrically connected to the fourth dummy data line and the gate lines extended from the display area and fourth dummy pixel electrodes electrically connected to the fourth dummy switching elements.

12. The display apparatus of claim 11, wherein the data driving chip includes a plurality of data driving chips, wherein the data driving chips each include a plurality of output channels which output data signals to the data lines and wherein at least one of the data driving chips further includes a plurality of dummy channels which output dummy signals to the first and second dummy pixel columns of the dummy load part and wherein the plurality of fanout connecting lines further divide the dummy pads into a third group including a plurality of odd numbered dummy pads and a fourth group including a plurality of even numbered dummy pads and wherein the plurality of odd numbered dummy pads of the third group of the dummy pads are connected to the third dummy data line of the third dummy pixel column and the plurality of even numbered dummy pads of the fourth group of the dummy pads are connected to the fourth dummy data line of the fourth dummy pixel column.

* * * * *